United States Patent [19]

Bardwell

[11] 4,160,199

[45] Jul. 3, 1979

[54] LINE OR PATTERN FOLLOWING SYSTEM

[75] Inventor: Francis G. Bardwell, Elmhurst, Ill.

[73] Assignee: Stewart-Warner Corporation, Chicago, Ill.

[21] Appl. No.: 812,787

[22] Filed: Jul. 5, 1977

[51] Int. Cl.² ............................................. G05B 19/36
[52] U.S. Cl. ..................................... 318/577; 250/202
[58] Field of Search ................ 318/577, 640; 250/202

[56] References Cited

U.S. PATENT DOCUMENTS

| | | | |
|---|---|---|---|
| 3,529,084 | 9/1970 | Rich | 250/202 UX |
| 4,049,962 | 9/1977 | Kallen | 250/202 |
| 4,059,788 | 11/1977 | Vasiliev et al. | 318/577 |

Primary Examiner—B. Dobeck
Attorney, Agent, or Firm—Merriam, Marshall & Bicknell

[57] ABSTRACT

This disclosure deals with a line or pattern following system for use with a machine including first and second motors for moving a device in first and second generally perpendicular directions. The system includes an array of light sensitive elements arranged at angularly juxtaposed positions, the array being positioned adjacent said line or pattern. An image of the line or pattern falls on the array and makes an angle θ with a reference point on the array. The system further includes means for sequentially scanning the outputs of the elements, and angle means responsive to said outputs and to said reference point for generating first and second signals. The first signal is a function of sin θ and is connected to control energization of the first motor, and the second signal is a function of cos θ and is connected to control energization of the second motor. The two motors, thus energized, produce relative motion of the array and the line or pattern, and move the array to follow the line or pattern.

14 Claims, 13 Drawing Figures

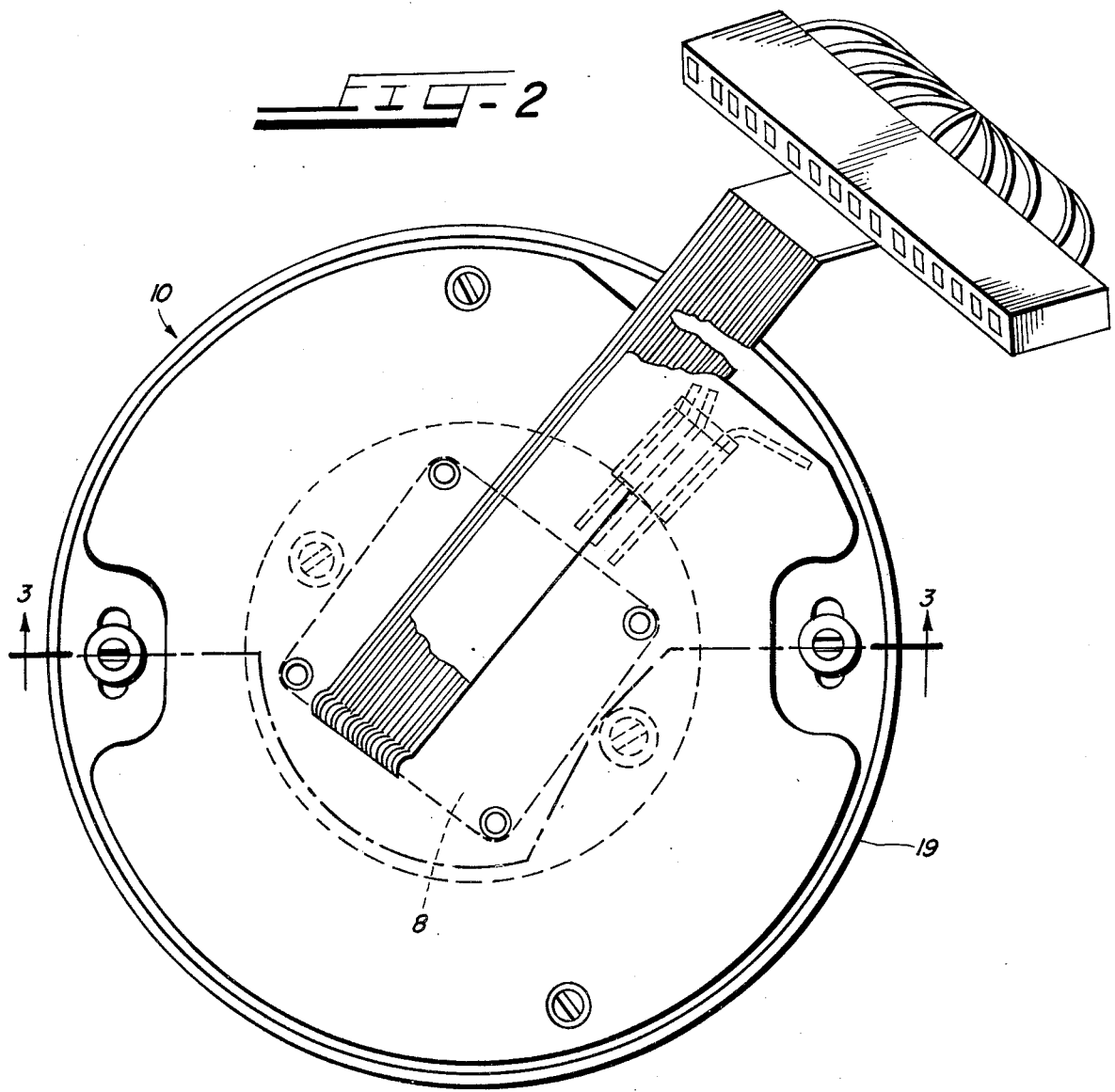
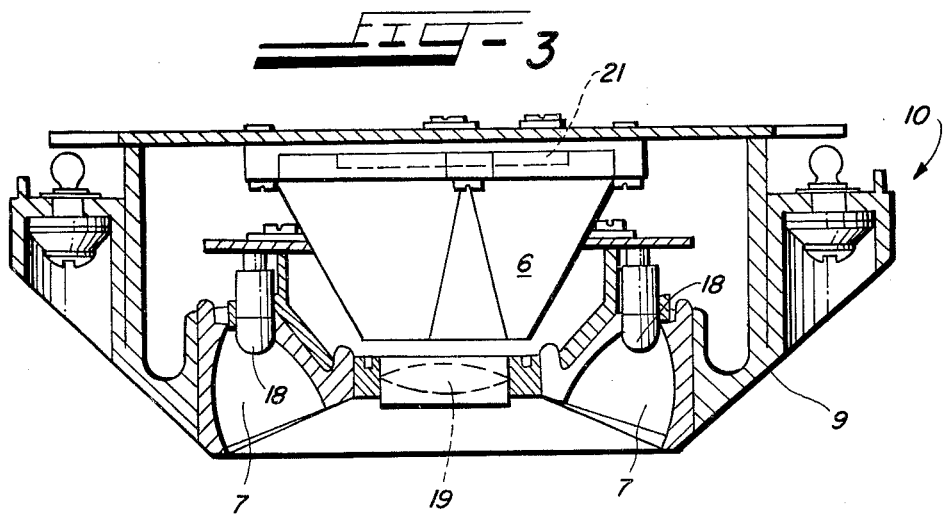

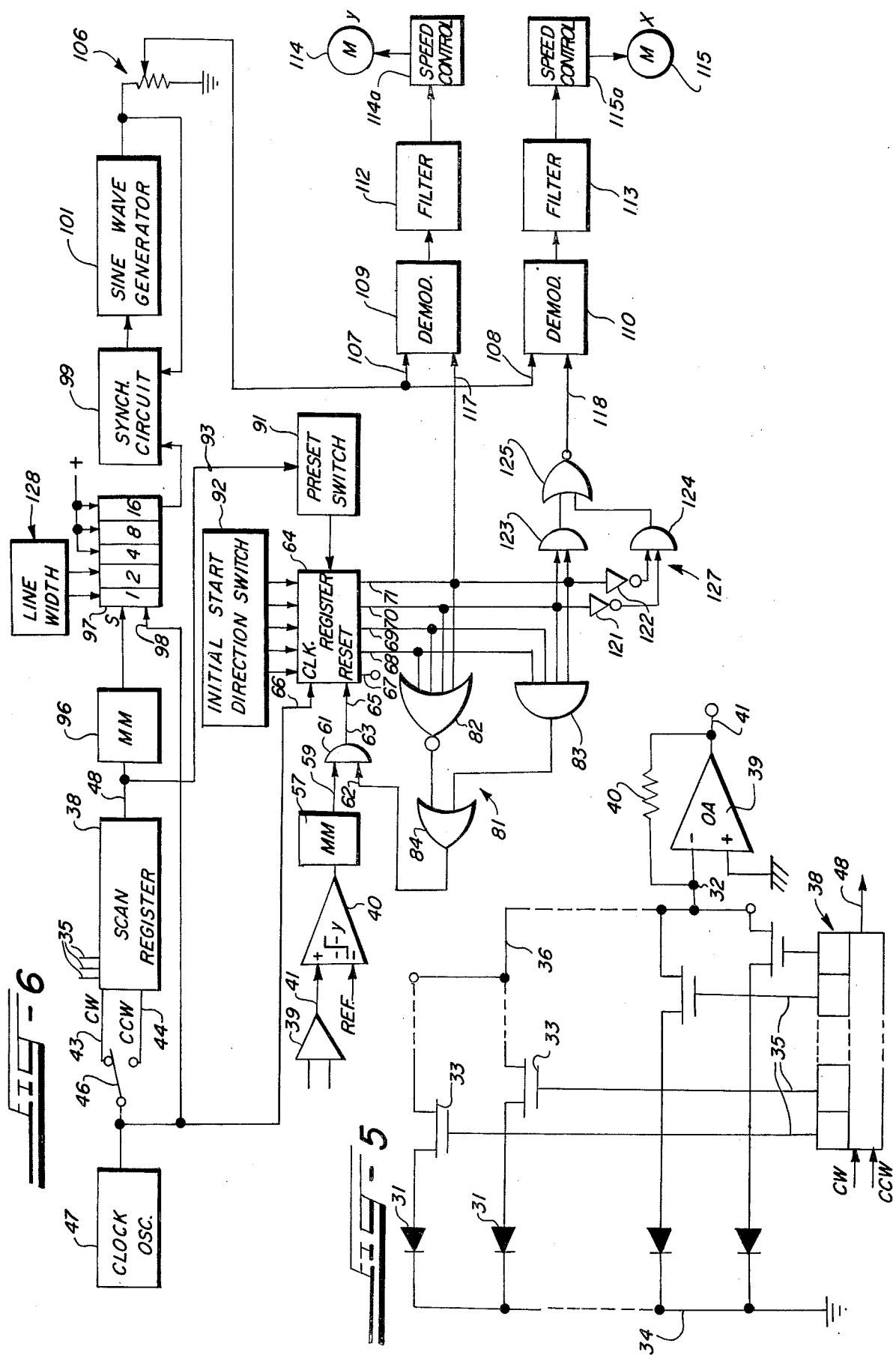

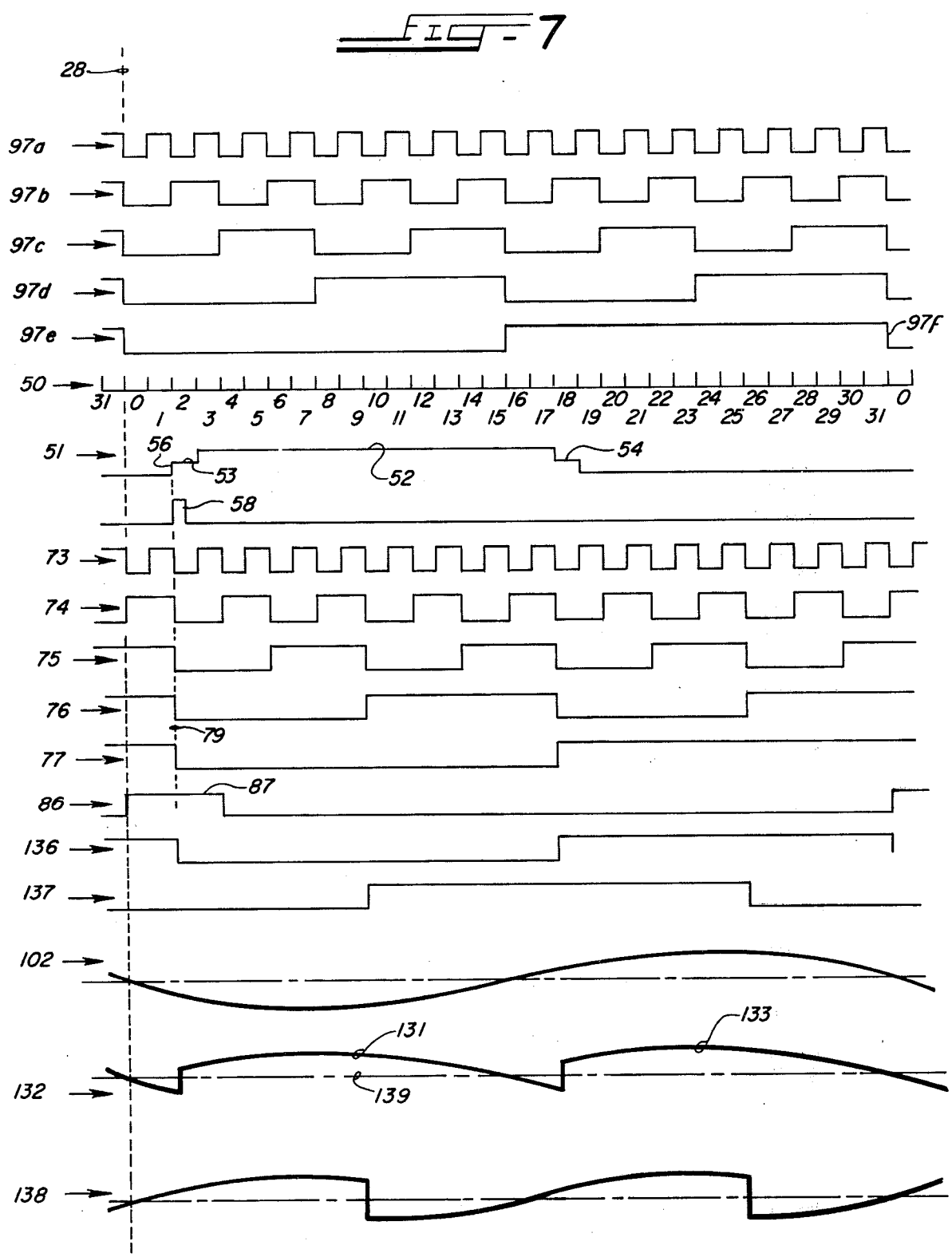

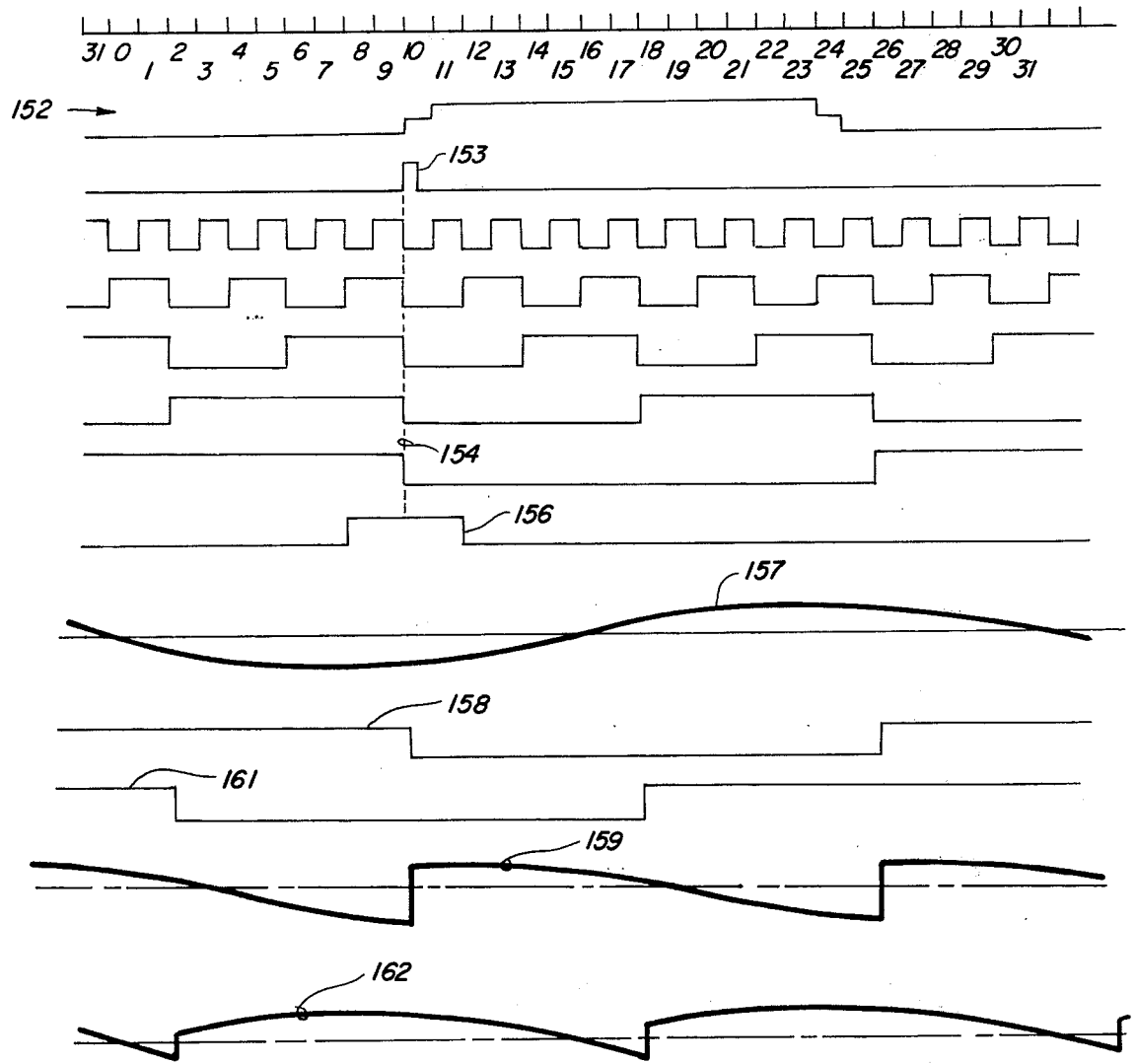

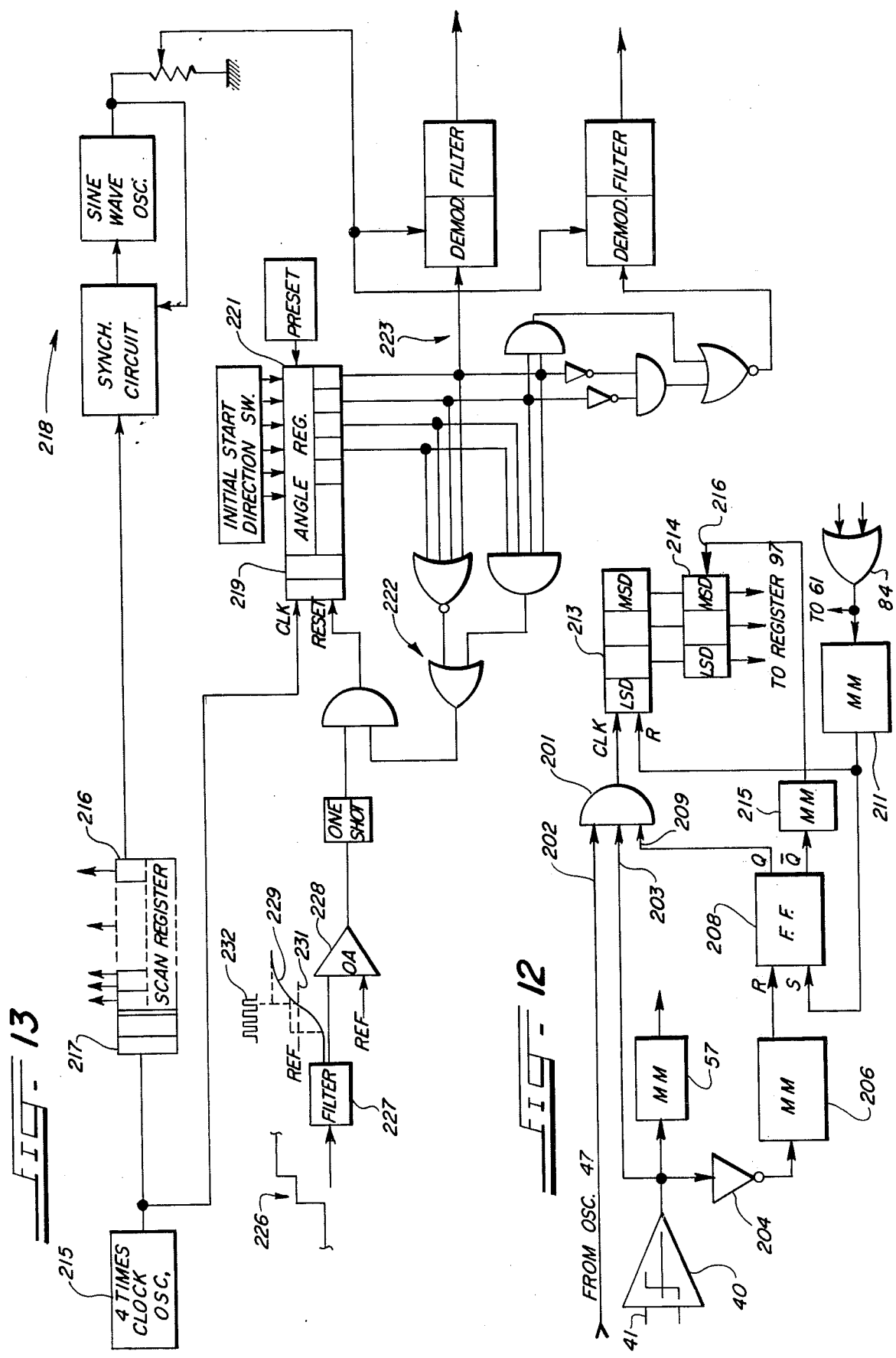

LINE OR PATTERN FOLLOWING SYSTEM

Systems have been provided in the past for following a line or an edge of a pattern. For example, the Brouwer U.S. Pat. No. 2,933,668 shows a curve tracer including a photocell and electrical circuitry for energizing motors to follow a curved line. Such a system is disadvantageous in that a rotating lens is required to scan the line, the moving parts of the arrangement making the Brouwer system relatively inaccurate and complicated. Similarly, the Murphy et al U.S. Pat. No. 3,883,735 shows a line tracer including means whereby a point on the pattern is viewed and the point is rotated in a circular path. While the scanning head is not described in detail in the patent, it would appear to have the same disadvantages as the Brouwer system.

Attempts have been made to remove the moving parts from such a system. The Haldo U.S. Pat. No. 3,198,949 appears to show a line following system without moving parts in the electrical circuitry, but the Haldo system is capable of controlling movement in one direction, or on one axis, only.

The Hannappel et al U.S. Pat. No. 3,534,162 discloses a follower control circuit and contains a discussion of the disadvantages of prior art systems that require moving parts. The Hannappel et al system attempts to reduce the number of moving parts in the electrical circuitry, but the result is a very complex and expensive switching arrangement. The Hannappel et al system includes a number of photosensitive elements, and each element requires a separate switching circuit.

It is a principle object of the present system to provide an improved line or pattern following system, which does not include moving parts in the electrical circuitry, which is highly accurate and sensitive, and which is not excessively complex and expensive.

A line or pattern following system in accordance with the invention is designed for use with a machine including a first motor for effecting movement in a first direction and a second motor for effecting movement in a second direction, said first and second directions being generally at right angles, said system comprising a plurality of photosensitive elements arranged in an array at angularly juxtaposed positions, said system being adapted to be positioned adjacent said line or pattern and an image of said line or pattern falling on said array, said image of said line or pattern making an angle $\theta$ with a reference point on said array, means for sequentially sensing the outputs of said elements, angle means responsive to said outputs and to said reference point for generating first and second electrical signals, said first signal being a function of $\sin \theta$ and said second signal being a function of $\cos \theta$, and means responsive to said signals for controlling energization of said motors in said first and second directions to obtain relative movement of said system and said line or pattern.

The foregoing and other objects and advantages of the present invention will become more apparent from the following detailed description taken in conjunction with the accompanying figures of the drawings, wherein:

FIG. 2 is an enlarged plan view of the head;

FIG. 3 is a sectional view taken on the line 3—3 of FIG. 2;

FIG. 5 is a multiplexing system for scanning the photocells of the array shown in FIG. 4;

FIG. 6 is a block diagram of the system;

FIG. 7 is a schedule of waveforms illustrating the operation of the circuits shown in FIGS. 5 and 6;

FIGS. 8 and 9 are similar to FIGS. 4 and 7 and further illustrate the operation of the circuits;

FIG. 12 is a block diagram of an alternate form of the system; and

FIG. 13 is another block diagram of still another alternate form of the system.

Figure 1:
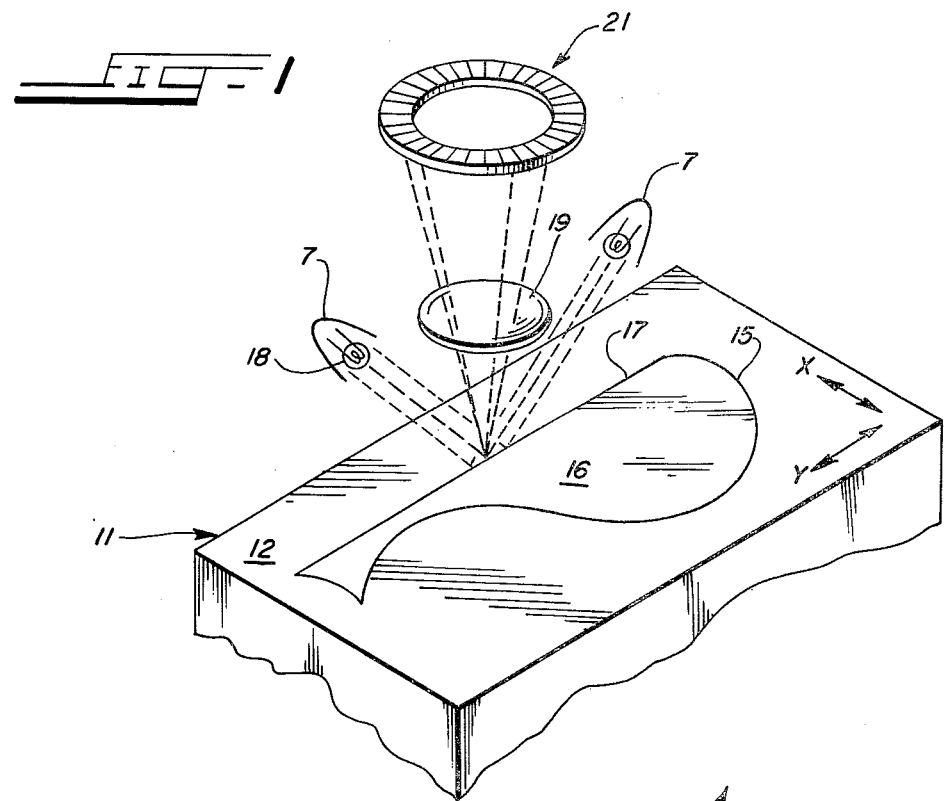
FIG. 1 is a diagrammatic perspective view of a scanning head of a line or pattern following system in accordance with the invention.
Figure 4:
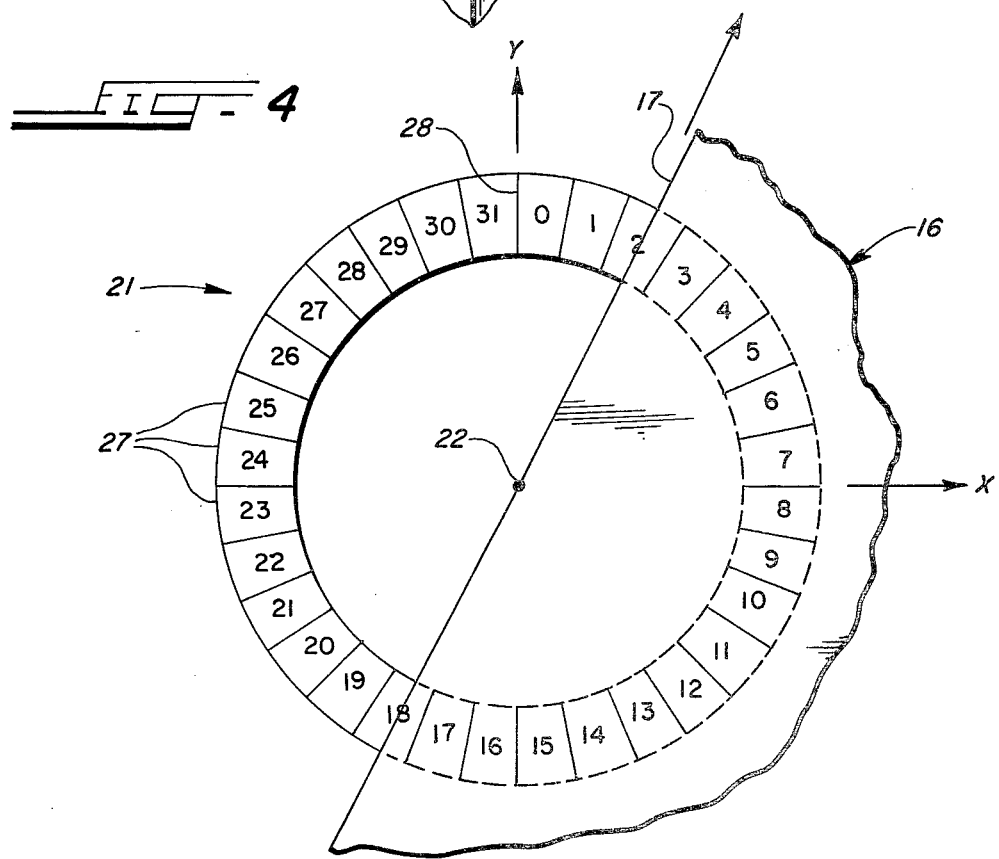
FIG. 4 is an enlarged diagrammatic view of a photocell array of the scanning head.

With reference to FIGS. 1 to 3, the system includes a scanning head 10 positioned adjacent a support or table 11 having a line or pattern receiving surface 12. Usually the table 11 is stationary and the surface 12 is flat and horizontal, and the scanning head 10 is mounted a short distance above the surface 12. As is well known to those skilled in this art, the scanning head 10 is movable relative to the table 11, and two electric motors (shown in FIG. 6) are provided to move the head, one motor being operable to move the head 10 along an X axis and the second motor being operable to move the head 10 along a Y axis. The two axes are generally perpendicular to each other as indicated in FIGS. 1 and 4, and by controlling one or the other of the two motors, or both simultaneously, the head 10 may be moved relative to the table 11. It would of course also be possible to provide the reverse arrangement where the scanning head 10 is held stationary and the table 11 is movable.

In the present example, a pattern 16 is provided on the upper surface 12 of the table 11. The pattern may be formed directly on the surface 12, but in the usual case, the pattern 16 is formed by a piece of reflective material such as stiff light colored paper which is fastened to the surface 12. In the example being described, the pattern 16 has a generally irregular shape except for a relatively straight edge 17 which is located directly below the head 10.

The scanning head 10 includes a housing 9 (FIGS. 2 and 3) which supports a plurality of light sources 18, such as incandescent lamps. The lamps 18 are angularly spaced to form a circular arrangement which is coaxial with the housing 9. On the axis of the housing is a lens 19 which is mounted in a container 6, and mounted above the lens 19 in the container 6 is an array 21 (FIG. 1) of light sensitive photocells which are formed on the underside of a printed circuit board 8. The container 6 is fastened on the board 8 on the lower side thereof. The lamps 18 are arranged in a plane which is parallel to the surface 12, and the lens 19 and the array 21 are also arranged in planes which are parallel to the surface 12. Parabolic reflectors 7 around the lamps 18 direct the light rays to a spot which is directly below the head 10 and on the axis of the lens 19 and the array 21. As indicated schematically in FIG. 1, the rays or light beams 22 from the lamps 18 fall on the surface 12 and the pattern 16 and the light rays 22 are reflected upwardly and pass through the lens 19 which focuses an image of the edge 17 on the array 21.

With reference to FIG. 4, an image of part of the pattern 16 is projected on the array 21. In the present example, the array 21 is made up of 32 separate or individual photocells 27, the photocells being given the numbers 0 through 31 for the sake of this description.

The array 21 is circular and the photocells 27 are arranged in side-by-side or in angularly juxtaposed positions. The photocells 27 are closely adjacent each other, so that there is little space or gap between adjoining photocells. The junction of the photocells numbered 31 and 0 is referred to herein as a reference position or point on the array 21 and is given the reference numeral 28. The reference point 28 also coincides with the Y axis previously referred to. The phtocells 27 are numbered in the clockwise direction from the reference point 28, and since there are 32 photocells in the present illustration, the juncture of the two photocells numbered 7 and 8 coincides with the X axis.

It should be kept in mind in the present description that, while the two motors previously referred to are able to move the head 10 on the X axis and the Y axis, the head 10 is normally not angularly adjusted during operation, although an initial angular adjustment may be made as will be described.

While the electrical connections are not illustrated in FIGS. 1 to 4 for the sake of clarity, such electrical connections are made to each of the photocells 27 and the lamps, and each of the photocells 27 is connected in the circuits illustrated in FIGS. 5 and 6.

Each of the photocells 27 consists of a photosensitive diode 31 (FIG. 5). An MOS transistor switch 33 is connected in series with each photodiode 31, the series arrangement being connected between a ground or common line 34 and an output line 36. The base 37 of each of the transistors 33 is connected to a scan register 38 (FIGS. 5 and 6) which may be a ring counter. The scan register 38 has 32 output leads 35, one lead 35 being connected to the base 37 of each of the transistors 33, and the scan register 38 sequentially biases the transistors 33 on as it steps through its 32 positions. When a photocell is sampled, the associated transistor 33 is turned on and the current flow of the photodiode flows into the summing junction 32. The output 41 of the amplifier 39 will change accordingly to produce an opposite current into the summing point 32 through resistor 40 in a well known manner. The current from the photocell is a function of the amount of illumination of the diode, and therefore the signal on the line 41 is a function of the illumination on the photocell. As the scan register 38 steps or counts through its 32 positions in a complete scan cycle, the transistors 33 are sequentially turned on, and the voltage signal appearing on the output line 41 at any particular instant will be dependent upon the amount of illumination of the diode 31 being sampled. A light background produces a negative voltage on the output 41, and a dark background produces a more positive voltage.

The components 38 and 39 are also shown in the circuit of FIG. 6. The scan register 38 has CW and CCW inputs 43 and 44, and a manually operable two-position switch 46 is connected between a clock oscillator 47 and the two imputs 43 and 44. When it is desired to scan the photocells 27 in the clockwise position as seen in FIG. 4, the switch 46 is placed in the CW position so that the clock pulses from the oscillator 47 are fed to the input 43. In this position of the switch, the scan register 38 counts through its 32 positions in increasing numerical order. If it is desired to scan the array of photocells 27 in the counterclockwise position, the switch 46 is connected to the CCW input 44 and in this position, the scan register 38 would count through its positions in the reverse order. The following specific examples of the operation of the system assumes that the switch 46 is connected to the CW position.

Each time the register 38 moves past the reference point 28 in going from photocell 31 to photocell 0, the register 38 generates a synch pulse, and the synch pulse appears on an output 48.

With reference to FIG. 7, the reference numeral 50 indicates a chart representing the time sequence of the scan register 38 as it sequentially samples the photocells 27. Because of the regular angular spacing and equal sizes of the photocells 27, the sampling time intervals for the photocells are equal and the cells are scanned sequentially. The number in each space of the chart 50 identifies the photocell 27 which is being sampled at a specific time, and time is considered as increasing toward the right. The reference time or point 28 occurs where the register 38 shifts from the photocell 31 position to the photocell 0 position. The reference point 28 is aligned with the Y axis, and the angle $\theta$ between the Y axis and a photocell being sampled is in these circumstances a function of time; thus, the time from the reference time 28 in FIG. 7 is equivalent to the angle $\theta$ of the photocell being sampled.

The curve 51 represents the voltage outputs of the photocells 27 and the operational amplifier 39 over one scan, which is the voltage on the output 41. With reference to FIG. 5, the instantaneous voltage signal 51 appearing on the output 41 of the amplifier 39 will be a function of the amount of light falling on the photocell which is being sampled at any particular instant. In the example being described, the photocell No. 2 is partially covered by the image of the pattern 16 as shown in FIG. 4, and the voltage level of the signal 51 during time interval No. 2 is approximately one-half the maximum voltage level represented by the numeral 52. For the pattern configuration shown in FIG. 4, the signal 51, during the sampling of the photocells numbered 19 through 31, 0 and 1, is at the zero or reference level. The signal 51 is high during the sampling of the photocells numbered 3 to 17. The two photocells numbered 2 and 18 are partially covered by the image of the pattern 16, and the voltage levels 53 and 54 occurring while the cells 2 and 18 are being sampled are intermediate the high and reference levels.

With reference to FIGS. 6 and 7, the voltage level 53 causes the level detector output to switch, triggering a one-shot or monostable multi-vibrator 57 which has its input connected to the output line of the level detector 40. The circuit 57 generates a relatively short squared pulse 58 which is connected to one input 59 and an AND gate 61. Assuming for the time being that the other input 62 of the AND gate 61 has a positive going signal appearing thereon, a positive pulse will appear on the output 63 of the AND gate 61, and this pulse is connected to a reset input 65 of a scan angle register 64 including a five stage binary counter. The register 64 has a clock input 66 connected to the output of the clock oscillator 47; after each time that the register 64 is reset by a pulse 58, the scan angle register 64 starts a new count of the pulses received from the clock oscillator 47. The scan angle register 64 has five outputs 67, 68, 69, 70 and 71 which are connected to successive stages of the counter. With reference to FIG. 7, the reference numerals 73, 74, 75, 76 and 77 respectively represent the voltage signals appearing on the outputs 67 through 71.

Since the rising or leading edge of the pulse 58 coincides with the photocell 2 and the detection of the edge 17 of the pattern 16 as the photocells 27 are scanned, it will be apparent that the scan angle resister 64 will begin a new count in synchronism with the detection of the edge 17 during each scan. The reference numeral 79 in FIG. 7 indicates the zero or reset time at which the register 64 begins a new count, and the time 79 is equivalent to the angle $\theta$, as previously mentioned.

To prevent spurious signals, or signals from two edges of a single pattern or line, from resetting the counter 64 more than once in each complete scan of the array 21, a window circuit 81 (FIG. 6) is provided to permit the pulse 58 to pass through the AND gate 61 to the scan angle register 64 but to block other pulses. The window circuit 81 comprises a NOR gate 82 having four inputs connected to the outputs 68 through 71 of the register 64, an AND gate 83 having four inputs connected to the same four outputs of the register 64, and an OR gate 84 having two inputs, one connected to the output of the NOR gate 82 and the other connected to the output of the AND gate 83. The output of the OR gate 84 is connected to the input 62 of the AND gate 61. The output of the OR gate 84 has a high output when either of its two inputs is high. The output of the NOR gate 82 will be high only when all of its inputs are low, and the output of the AND gate 83 will be high only when all of its inputs are high. With reference to FIG. 7, it will be noted that the signals 74, 75, 76 and 77 are all high for the two counts or cycles just preceding the time 79, and therefore, the output of the AND gate 83 will be high for these two cycles. Similarly, it will be noted that the signals 74 through 77 are all low for the two cycles immediately following the time 79, and for these two following cycles, the NOR gate 82 will produce a high signal. Consequently, the output of the OR gate 84, represented by waveform 86 in FIG. 7, will be high as indicated by the pulse 87 for the two cycles just prior to the time 79 and also for the two cycles just following the time 79. The pulse 87 may be considered a window pulse and is connected to the input 62 of the AND gate 61, and it enables the pulse 58 from the circuit 57 to pass to the scan angle register 64. The window pulse 87 exists only for this short period of time, and during the remainder of the scanning cycle, signals cannot pass to the scan angle register 64 and reset it. Since the pattern angle will not change faster than a small increment from one scan cycle to the next, the pulse 58 will coincide with the window pulse 87.

As will be explained hereinafter, a preset switch 91, connected by a line 93 to the output 48 of the register 38, and a start direction switch 92 are employed to initially start the system in operation.

The synch pulse generated each time the register 38 counts past the reference point 28 actuates a one-shot or monostable multivibrator 96 which has its output connected to the set input of a scan counter 97, with the result that the scan counter 97 is reset at the beginning of each scan cycle of the array 21. The clock input 98 of the scan counter 97 is connected to the output of the clock oscillator 47, and a new count of the clock oscillator 47 pulses starts at time zero, or at each occurrence of the reference point 28. The counter 97 has five stages, and the output signals of the stages are indicated by the waveforms 97a, 97b, 97c, 97d and 97e (FIG. 7). At the shift or transition of the scan counter 97 from the number 31 to zero, the occurrence of the most significant digit (MSD) 97f actuates a synchronizing circuit 99 which has its output connected to the input of a sine wave generator 101. The output of the generator 101 is also connected to an input of the synch circuit 99; and the generator 101 provides a sine wave 102 (FIG. 7) in a manner well known to those skilled in the art. There is a zero crossing of the sine wave 102 which is synchronized with the time of occurrence of the reference point 28. The sine wave 102, in the present example, has a negative half cycle which occurs during the scan of the photocells numbered 0 through 15 and a positive half cycle which occurs during the scan of the photocells numbered 16 through 31.

The output of the sine wave generator 101 is fed through a variable resistor 106 which may be manually adjusted to obtain the desired amplitude of the sine wave 102, and to thereby control the speed of the two drive motors. The sine wave 102 appears on the wiper of the variable resistor 106 which is connected to the inputs 107 and 108 of two demodulators 109 and 110, respectively. The outputs of the two demodulators 109 and 110 are connected through two filters 112 and 113 to a speed control 114a and motor 114 and to a speed control 115a and motor 115. The two motors 114 and 115 are the two motors previously referred to which are connected to move the head 9 in the X and Y directions relative to the table 11. Conventional drive connections, such as rack and pinion gears, are provided between the motors 114 and 115 and the head 9.

The two demodulators 109 and 110 each have additional input connections 117 and 118, respectively. The input 117 of the demodulator 109 is connected to the output 71 of the scan angle register 64, and the input 118 of the demodulator 110 is connected to the output of a quadrature circuit 127. The quadrature circuit 127 includes two inverters 121 and 122, an AND gate 123, another AND gate 124, and a NOR gate 125. The outputs 70 and 71 of the register 64 are connected to both inputs of the AND gate 123 and to the inputs of the two inverters 121 and 122. The outputs of the two inverters 121 and 122 are connected to both inputs of the AND gate 124, and the two inputs of the NOR gate 125 are connected to the outputs of the two AND circuits 123 and 124. The outut of the NOR gate 125 is connected to the input 118 of the demodulator 110.

The output voltage of the demodulator 109 follows or corresponds to the voltage on the input 107 when the voltage on the input 117 has a high or positive value. When the voltage at the input 117 has a zero or low value, the demodulator inverts the input 107. The output 71 of the scan angle register 64 appears on the input 117 and is indicated by the waveform 136. As can be seen from FIG. 7, during the first half, or the first 180°, the waveform 136 is low. During this time, the sine wave will appear in inverted form at the output 132 (FIG. 7) of the demodulator 109, and this inverted portion is indicated by the reference numeral 131. During the second half of the count of the register 64, the output 71 is high and therefore the portion 133 of the output 132 follows the sine wave 102.

The quadrature ciruit 127 produces the waveform 137 which is in quadrature, or displaced 90°, from the waveform 136. When the voltages on the two outputs 70 and 71 are both high, the output of the AND gate 123 is high and the output 137 of the NOR gate 125 is low. Conversely, when the two output 70 and 71 are both low, the two inputs of the AND gate 124 are both high, and a high input will be provided at the other input of the NOR gate 125, and once again the output of the gate 125 will be low. It will be apparent therefore that the signal 137 on the input 118 will be low either when the outputs 70 and 71 are both high or when they are both low. Otherwise, the input 118 has a high value. Once again, while the signal 137 on the input 118 is high, the voltage (see waveform 138) at the output of the demodulator 110 follows the sine wave 102, and while the signal 137 is low, the voltage is inverted.

The two filters 112 and 113 average the output voltage signals 132 and 138 of the two demodulators 109 and 110. As will be noted from FIG. 7, the majority of the signal 132 is above the zero reference line 139, and consequently, the output of the filter 112 is a positive voltage which represents the average of the signal 132. The signal 138, when averaged by the filter 113, will also have a positive value but it will be lower than the signal 132. The outputs of the two filters 112 and 113 are connected to control the speeds of the two motors 114 and 115, and the speed and direction of rotation of each of the motors is dependent upon the magnitude and polarity of the average voltages out of the filters. For example, if the average of the signal 132 is a high positive value as illustrated, the motor 114 will be driven at a relatively fast rate in one direction whereas if the average voltage is negative, the motor will be driven in the opposite direction and at a speed which is a function of the magnitude of the average voltage. In the example illustrated in FIGS. 1, 4 and 7, the motor 114 is coupled to move the scanning head in the Y direction and it will be powered at a relatively high rate and in the upward direction, whereas the X direction drive motor 115 will be powered to move the head toward the right but at a slower rate of speed. This will cause the head, including the array 21, to move primarily in the Y direction but with a component in the X direction, and the head will move upwardly and toward the right as seen in FIG. 4 and will maintain the center point 22 or axis of the array 21 on the edge 17.

To summarize briefly the operation of the system, the clock oscillator 47 generates a train of clock pulses which cause the scan register, or ring counter, 38 to sequentially sample the photocells 27. When the sampled photocell is darkened by an edge of the pattern 16, a voltage appears at the output 41 of the amplifier 39 which resets the scan angle register 64. Consequently, the starting time 79 of the scan angle register 64 is indicative of the angle $\theta$ of the edge 17. The sine wave generator 101 provides a sine wave voltage 102 in synchronism with the reference point 28. The sine wave 102 serves as a reference signal and it is fixed in time with the starting time 28. The output voltages of the generator and the angle register 64 are combined to produce two voltages, the voltage 138 which is proportional to sin $\theta$ and powers the X axis drive motor 115, and the voltage 132 which is proportional to cos $\theta$ and powers the Y axis drive motor 115.

The system may also include a line width compensation or adjustment circuit 128 connected to the register 97, which will be described hereinafter. If a line width compensator is not provided, the output of the scan register 38, if it is a binary counter, could be connected to the input of the synch circuit elements 99 and 101.

The circuits 91 and 92 are operative during the start of a tracing operation. After the pattern to be traced is placed on the table surface, the scanning head 10 is manually positioned adjacent to but off of the pattern. This may be done by temporarily manually disengaging the gear drives between the motors 114 and 115 and the head 10, and then manually moving the head. The start direction switch 92 and preset circuits are operative to initially start the system to move the scanning head to the adjacent edge of the pattern, after which the switch 92 is inoperative and the system operates automatically as previously described. The switch 92 may for example include a plurality of manually operable switches, each such switch being connected to reset the register 64 at a different time or angle. For example, if the scanning head were initially positioned to the left of the pattern 16, it would be necessary to move the head 10 primarily along the X axis toward the right. The preset switch 91 would be manually actuated and the next synch pulse appearing on the line 93 would preset the register 64 to the proper direction as indicated by the selected switches in the circuit 92. The register 64 would then be set 90° from the scan register. The register 64 would then generate a window pulse and power the drive motors to move the head to the edge 17 of the pattern, and a reset pulse appearing on the input 65, upon the detection of the edge, would deactivate the switch circuit 92 and 91. As mentioned, a plurality of switches may be provided in this circuit 92, each associated with a different desired direction of movement of the head.

Still another method is to provide a catch circuit connected to the input 62 of the AND gate 61 which would provide a window pulse for a complete scan cycle. Manual speed control circuits for the motors 114 and 115 would be provided to move the head to the pattern. The first pulse 58 resulting from a pattern crossing would be connected to automatically turn off the catch circuit and the manual speed control.

Figure 8:
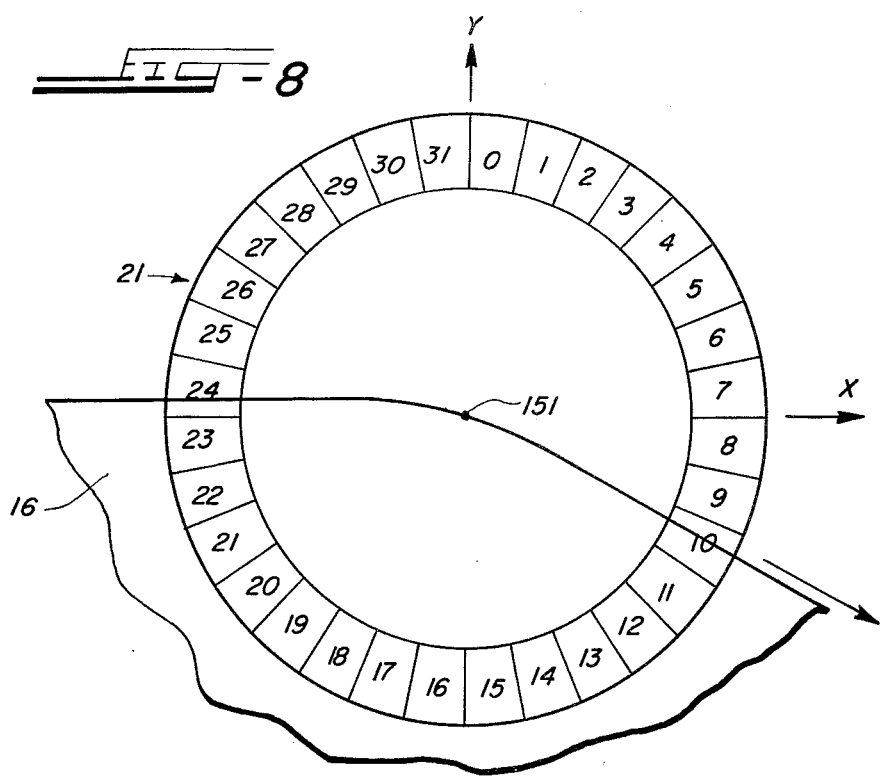

FIGS. 8 and 9 further illustrate the operation of the system, and show the operating conditions when the array 21 is over approximately the point 151 (FIGS. 1 and 8) of the pattern 16. The edge of the pattern 16 crosses the photocells 10 and 24, and as the photocells are sampled, a voltage 152 (FIG. 9) is generated on the output 41. The voltage 152 rises during the time interval 10 and falls during the time interval 24. The multivibrator 57 generates a pulse 153 which resets the angle counter 64 at the starting time 154. A window pulse 156 is generated which passes the pulse 153. The sine wave generator 101 provides a sine wave 157. The voltage on the input 117 of the demodulator 109 is shown by the waveform 158, and the voltage out of the demodulator 109 is shown by the waveform 159. The input and output of the demodulator 110 are shown by the waveforms 161 and 162. The average value of the waveform 159 has small negative value representative of cos $\theta$ and powers the Y motor 114. The average of the waveform 162 has a large positive value representative of sin $\theta$ and powers the X motor 115. The head 10 will therefore be moved rapidly in the positive X direction, or toward the right, and to a smaller extent in the negative Y direction, or downwardly, as seen in FIG. 8.

Figure 10:
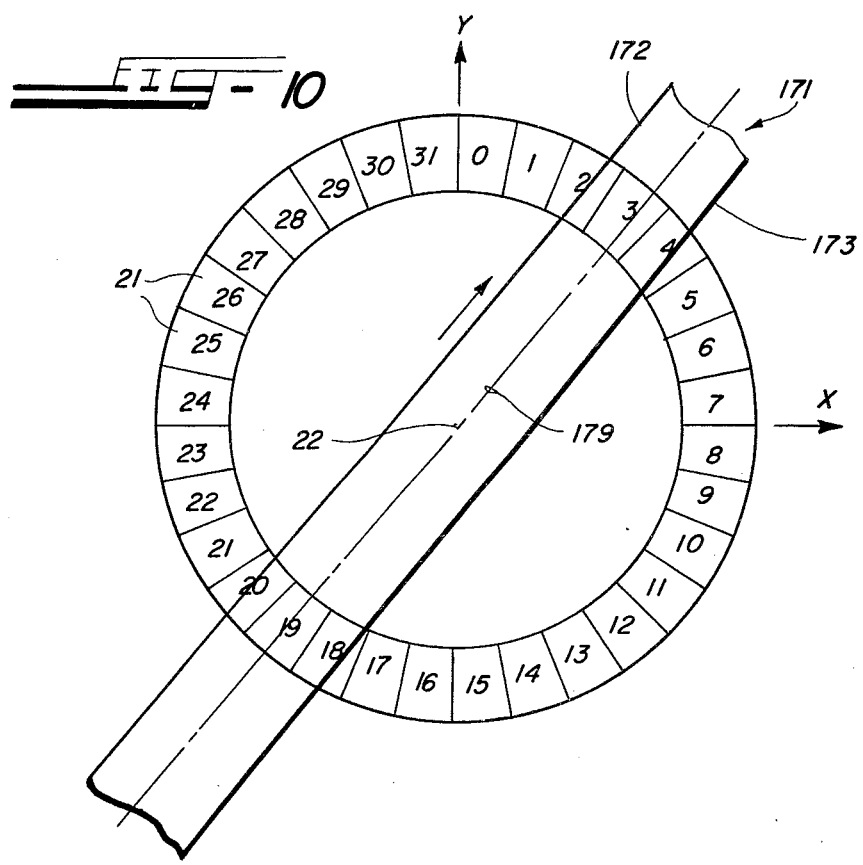
FIGS. 10 and 11 are also similar to FIGS. 4 and 7 and still further illustrate the operation of the circuits.
Figure 11:
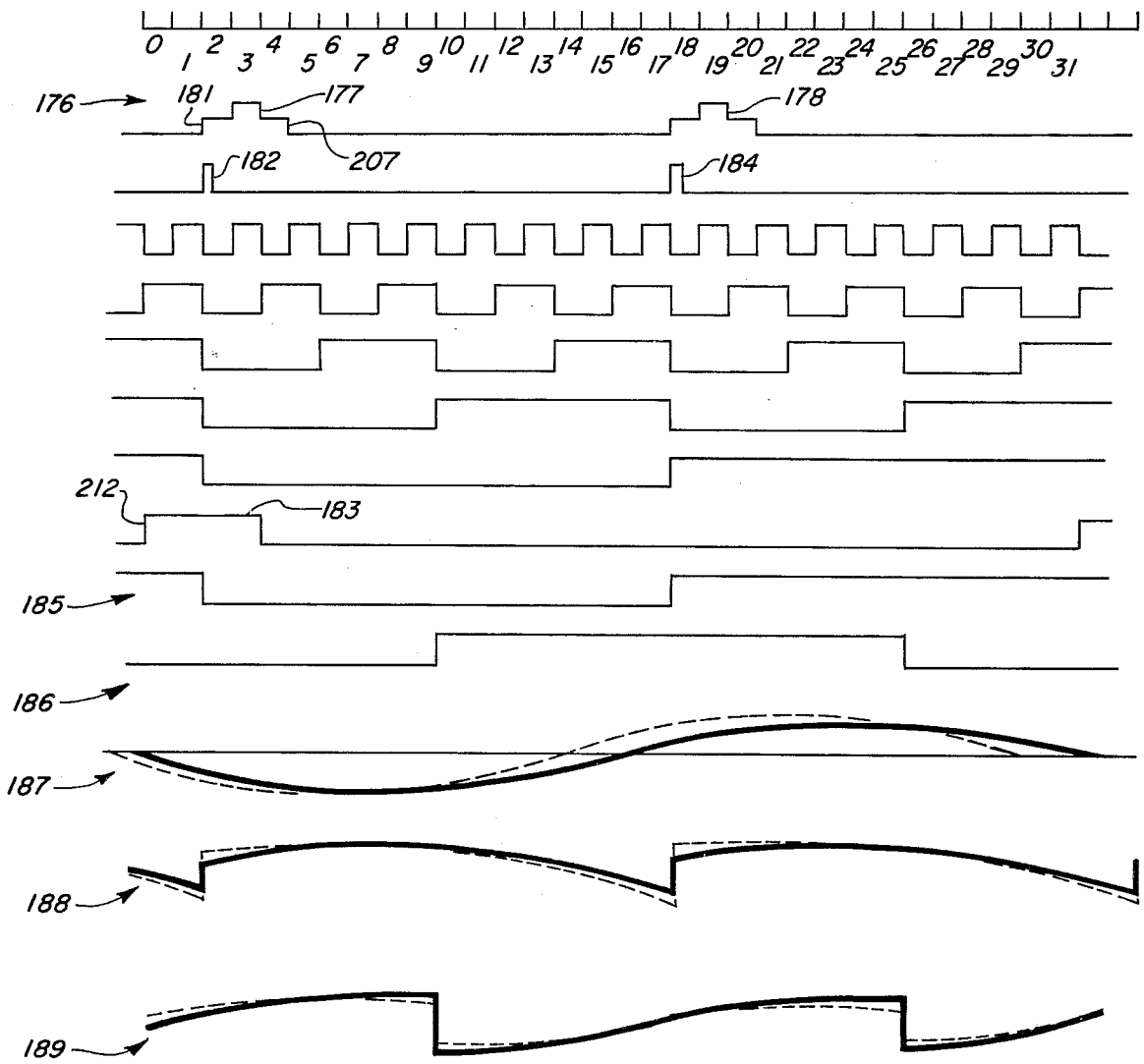

FIGS. 10 and 11 illustrate the operation of the system when tracing a line 171 having a width between two edges 172 and 173. The edge 172 crosses the photocells 2 and 20 and the edge 173 crosses the photocells 4 and 18, thus producing the voltage signal 176 (FIG. 11) on the output 41, the signal 176 having two voltage pulses 177 and 178.

To improve the accuracy, the system may be adjusted to track the center of the line 171, the center being indicated by the dashed line 179. It will be noted that the center 176 falls on the photocells 3 and 19 when the center line 22 of the array 21 falls on the line center 179. The width of the line 171 is equivalent approximately to two fo the photocells 27.

One way to adjust for the line width would be to loosen the head 10 on its mount (not shown) and angularly adjust the head by the width of one photocell 21. The relative positions of all of the waveforms would then remain as shown in FIG. 11, but the array 21 would be angularly offset in the counterclockwise direction by the amount equal to one photocell, relative to the X and Y axes and to the line 171.

The preferred way to adjust for line width is to utilize the circuit 128 shown in FIG. 6, which is connected to the register 97. An estimate of the line width is made, in this example the width being two photocells wide. The line width adjustment circuit 128 is operable to preset the register 97, and in the present example, the circuit 128 is manually adjustable to preset the register 97 to a count of one. Consequently, the register 97 would be offset by a count of one from the pulses 177 and 178, and the sine wave 187, which is the reference signal, would be offset by the width of one photocell.

The leading edge 181 of the pulse 181 generates a pulse 182 which resets the register 64, the pulse 182 passing through the gate 61 due to the presence of a window pulse 183 as previously explained. The signal 178 also generates a pulse 184 but a window pulse is not generated at this time, and therefore the pulse 181 does not reset the register 64.

The remainder of the circuit operation is as previously described. The signals 185 and 188 appear on the input and output of the demodulator 109, and the signals 186 and 189 appear on the input and output of the demodulator 110. The sine wave 187 is produced by the generator 101. Without the line width adjustment, the signals 187, 188 and 189 appear as shown in solid lines. With the line width adjustment, they are offset by one count to the positions shown in dashed lines.

FIG. 12 illustrates a circuit which may be used in the system of FIGS. 5 and 6 and which will automatically compensate for the width of the line 171. An AND gate 201 has an input 202 connected to receive the output of the oscillator 47, which consists of a train of square pulses. Another input 203 is connected to receive the signal 176 from the photocell array. The signal 176 is also fed through an invertor 204 to a one-shot or monostable multivibrator 206 which, due to the invertor 204, is triggered by the trailing edge 207 of the pulse 177. The output pulse of the one-shot 206 is connected to the reset input of a flip-flop 208 which has its Q output connected to a third input 209 of the AND gate 201. The set input of the flip-flop 208 is connected to the output of a one-shot or monostable multivibrator 211. The input of the one-shot 211 receives the window pulse 183.

In operation, the leading edge 212 of the window pulse 183 triggers the one-shot 211 and sets the flip-flop 208, causing the Q output and the input 209 to be high or positive. When the pulse 177 appears, the input 203 also becomes positive, and the output of the AND gate 201 then follows the square wave output of the oscillator 47. The oscillator pulses are counted by a register 213 which in this illustration has four stages. Prior to the counting operation, the register 213 was reset by the pulse out of the one-shot 211. When the trailing edge 207 occurs and resets the flip-flop 208, causing the input 209 to become low, the register 213 has counted two oscillator pulses. Consequently, the count in the register 201 indicates the total line width.

Another register 214 is connected to the outputs of the second, third and fourth stages of the register 213. By shifting one stage or bit, the output is, in effect, divided by two. In the present example, the register 214 will have a count of one set into it. The register 214 is a latch and hold circuit which has a count transferred to it when a latch command signal appears on an input 216 which is connected to the $\overline{Q}$ output of the flip-flop 208 through one shot 215. Consequently, the count is transferred and held until the next transfer, at the trailing edge 207 of the pulse 177, which resets the flip-flop 208. The output of the register 214 is connected to preset the register 97 in place of the circuit 128.

FIG. 13 illustrates another form of the system which is generally similar to FIG. 6 but provides increased accuracy. An oscillator 215 has, in the present example, four times the frequency of the oscillator 47. A scan register 216, which operates as a shift register similar to the register 38, has a two bit down counter 217 connected between its input and the oscillator 215. The counter 217 reduces the frequency by a factor of form, and consequently the register 216 and the sine wave generator 218 operate as shown in FIG. 6. The oscillator 215 output is also connected to a two bit or two stage counter 219 which is added to the beginning of the angle register 221, the counter 219 being added to increase the size and thereby the resolution. The last four stages of the register 221 are connected to the window circuit 222 and to the motor drive circuit 223.

The output signal of the photocell array is shown at 226 and is passed through a filter 227 before blowing to the level detector 228. The filter 227 smooths the signal 226 and introduces a time delay, as shown by the signal 229. Due to the increased frequency of the oscillator 215, four pulses 232 will occur in the time span of the scan of one photocell. The detector 228 will detect approximately the voltage level 231 which occurs approximately during the fourth of the pulses 232. In this manner, the resolution of detection, or the time of resetting the angle register 221, is increased.

It will be apparent from the foregoing that a novel and useful tracing system has been provided. The scanning head will trace a dark line on a light background, as the photocell array is scanned at, for example, approximately 400 cycles per second. The drive motors may be a direct current, permanent magnet or shunt wound field motor, and the signal to each motor is a plus or minus DC voltage. The window circuit is provided to accommodate two or more edges of a line, noise, or dirt on the pattern paper. The line width adjustment circuit may also be used for tool width adjustment. Instead of using two motors and a drive as described, a gantry machine may be used where two motors, responsive to one signal, control movement in one direction and one or two motors, responsive to the other signal, control movement on a cross axis. The system has been described wherein the pattern is in a horizontal plane, but of course the pattern could be in a vertical plane.

I claim:

1. A system for tracing a line or pattern, comprising a plurality of angularly spaced light-sensitive devices, arranged in an array, which has a reference point, a first drive motor for moving said array in a first direction, a second drive motor for moving said array in a second direction which is at substantially a right angle to said first direction, said array being adapted to be positioned adjacent said line or pattern and an image of an edge of the line or pattern falling on said array and making an angle $\theta$ with said reference point, means for sequentially sampling said devices, and means responsive to said reference point and to said sampling means and powering said first drive motor at a speed which is a function of sine $\theta$ and powering said second drive motor at a speed which is a function of cos $\theta$.

2. A line or pattern following head for a machine including a first motor for effecting movement in a first direction and a second motor for effecting movement in a second direction, said first and second directions being generally at right angles, said head comprising a plurality of photosensitive devices arranged in an array at angularly juxtaposed positions, said array having a reference point, said head being adapted to be positioned adjacent said line or pattern and an image of said line or pattern and an image of said line or pattern falling on said array, said image of said line or pattern making an angle $\theta$ with said reference point, means for sequentially sampling the outputs of said devices, angle means responsive to said outputs and to said reference point for generating first and second electrical signals, said first signal being a function of sine $\theta$ and said second signal being a function of cos $\theta$, and means responsive to said signals for controlling energization of said motors in said first and second directions to obtain relative movement of said head and line or pattern.

3. A system for tracing a line or pattern, comprising a plurality of light-sensitive devices arranged in a generally circular array, means for sequentially sampling the outputs of said devices, said devices being sampled in a cyclically recurring manner, means providing a reference output which has a fixed phase relation with said cyclical sampling, angle means providing a reference output which has a fixed phase relation with said cyclical sampling, angle means providing an angle output which is representative of the angle of said line or pattern relative to a reference point on said array, and drive control means responsive to said reference output and to said angle output and providing drive signals representative of said angle.

4. A line or pattern tracing system for sensing an edge of a line or pattern and for controlling energization of first and second drive motors to follow the edge, comprising a plurality of photosensitive devices arranged in a generally circular array which has a reference point, said edge making an angle $\theta$ relative to said reference point, means for sequentially sampling the outputs of said devices in a cyclical manner, and means responsive to said sampling means and to said outputs and providing motor drive control signals which are functions of said angle $\theta$.

5. A line or pattern tracing system for sensing an edge of a line or pattern and for controlling energization of first and second drive motors to follow the edge, comprising a plurality of photosensitive devices arranged in a generally circular array which has a reference point, said edge making an angle $\theta$ relative to said reference point, means for sequentially sampling the outputs of said devices in a cyclical manner, means responsive to said sampling means and providing a reference signal having a fixed phase relative to said reference point, means responsive to said outputs and providing an angle output representative of said angle $\theta$, and drive control means responsive to said reference signal and to said angle output and powering said drive motor.

6. A line or pattern tracing system for sensing an edge of a line or pattern and for controlling energization of first and second drive motors to follow the edge, comprising a plurality of photosensitive devices arranged in a generally circular array which has a reference point, said edge making an angle $\theta$ relative to said reference point, means for sequentially scanning said device in cyclical manner and providing a synch signal each time said reference point occurs, means responsive to said synch signal for providing a reference signal which has a fixed phase with said synch pulse, angle means responsive to the outputs of said devices and providing an angle output representative of the angle $\theta$, and means responsive to said reference signal and to said angle output and providing a first drive motor control signal representaive of sine $\theta$ and a second drive motor control signal representative of cos $\theta$.

7. A system as in claim 6, and further including window circuit means responsive to said angle output and controlling the receipt of said outputs by said angle means.

8. A system as in claim 6, wherein said means providing a reference signal includes a counter for making a count of the devices as they are scanned, and a reference signal generator responsive to the output of said counter.

9. A system as in claim 8, wherein said reference signal generator provides a sine wave.

10. A system as in claim 8, and further including means for offsetting the count in said counter.

11. A system as in claim 10, wherein said offsetting means include means for measuring a line width and automatically offsetting the count.

12. A line or pattern following system for controlling energization of first and second variable speed motors, said first and second motors being respectively connected to move apparatus along first and second axes, said system comprising an annular array of light sensitive devices, means for focusing an image of the line or pattern on said array, said array including a reference point having a predetermined angular orientation relative to said first axis, means for sequentially scanning said photocells of said array, for sensing the angle formed between said reference point and said line or pattern, and for providing motor speed control signals that are trignometric functions of said angle $\theta$.

13. A system as in claim 12, wherein said last named means comprises a signal generator responsive to said reference point for providing a reference signal synchronized in phase with said reference signal, clock register means responsive to said scan of said array for sensing said angle $\theta$, and control signal means responsive to said reference signal and to said angle $\theta$ for providing said control signals.

14. A system as in claim 13, wherein said reference signal comprises a sine wave, and said control signal means comprises first demodulator means responsive to said sine wave and to said angle $\theta$, and second demodulator means responsive to said sine wave and to the quadrature of said angle $\theta$.

* * * * *